Oct. 16, 1956
R. JEVELOT ET AL
2,766,485
MANUFACTURE OF MICROPOROUS SCREENS
Filed Nov. 4, 1952
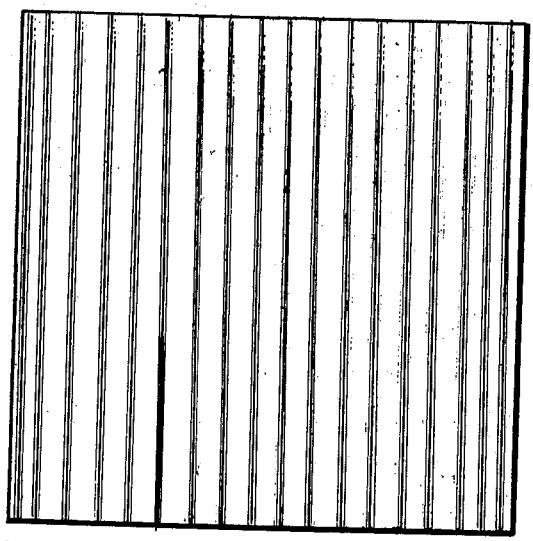
Fig.1
Fig.2.
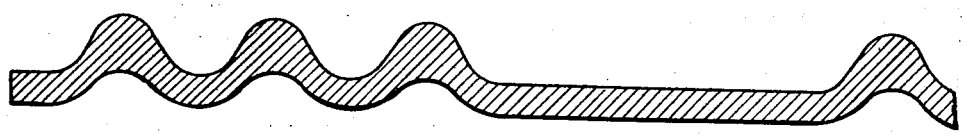
Fig.3
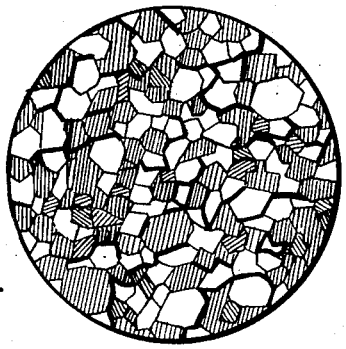
Fig.4
Inventors
Rene Jevelot
Jacques Ahrweiler
By Robert E. Burns
Attorney

2,766,485
MANUFACTURE OF MICROPOROUS SCREENS

René Jevelot and Jacques Ahrweiler, Paris, France, assignors to Compagnie de Caoutchouc Manufacture "Dyanamic," Paris, France Application November 4, 1952, Serial No. 318,717

Claims priority, application France December 27, 1951

13 Claims. (Cl. 18—53)

The present invention relates to micro-porous screens intended, for example, for use as separators for electric accumulator batteries, filters and screens for filter presses, absorbent baffles or buffers, or for any similar use.

It is known that, especially in the case of electric accumulators, it is necessary to dispose between the positive and negative plates of one element, separators which have the double function of preventing short-circuits between the plates and of nevertheless allowing the electrolyte to pass in order to permit transmission of the electric current between the plates.

It is desirable to find for the construction of these separators a material of such composition that it permits the passage of the electrolyte charged with current and at the same time prevents short-circuits between the plates, which may be caused by particles or protuberances of active material emanating from the said plates. For this application, the said material must also have good dielectric strength and good resistance to acids.

Hitherto, the separators employed for this purpose have generally consisted of sheets of ebonite or plastic materials of ribbed, goffered or perforated form, or of specially treated sheets of wood, or more recently of micro-porous ebonite.

These various separators have the disadvantage that they possess appreciable internal resistance or necessitate large, expensive installations for their production.

The present invention relates to the manufacture of screens of micro-porous plastic material which permit of obtaining the aforesaid results, and has more especially for its object to provide a process for the production thereof, which process, by reason of its simplicity, affords a means of conveniently and economically manufacturing the screens in question. The said screens according to the invention are composed of plastic materials (synthetic resins, for example vinyl resins, polystyrene or latex of vinyl resins) intended to serve as binders, dry absorbent materials such as dehydrated silica gels, wood meal, pumice powder and various plasticizers and loading agents, the whole in suitable quantities and, if desired, after partial mixing operations.

Natural or synthetic rubber or the latex thereof may be added to, or substituted for, the plastic materials.

While the prior processes for the manufacture of microporous elements have comprised pressure moulding at high uniform pressure which necessitates the presence in the components, for the formation or preservation of the pores, of elements capable of being subsequently removed by solution, evaporation, dissolution in acids or solvents or by firing, the process according to the invention permits of using dry absorbent materials of low strength, the initial porosity of which is maintained throughout the operation without necessitating the presence of an agent for maintaining or restoring such porosity.

Consequently, the process according to the invention consists in agglomerating the components in the hot or cold state, after they have been mixed, by subjecting them to a moderate pressure, for example ten to twenty times lower than those employed for the normal moulding of plastic materials, which pressure need not, according to one feature of the invention, be the same over the entire surface of the product (for example by exerting the pressure by means of two surfaces, the distance between which is not constant over their entire area), so that it is possible to adjust the degree of porosity, that is to say, to vary this degree of porosity over the area of the body in such manner that some zones are more porous than others. This inequality of porosity produces differences in mechanical properties which permit of obtaining parts of higher mechanical strength.

The product is then jellified or vulcanised at a temperature of about 120° to 180° C.

One example of a practical method of producing this micro-porous diaphragm consists in:

1. Mixing 20 parts of vinyl chloride, 10 parts of powdered silica gel, 4 parts of tricresyl phosphate and 3 parts of talc.

2. Moulding and pre-compressing this mixture in order to obtain a two-thirds volume reduction.

3. In heating the screen obtained in the open air at 175° C. for five minutes.

A preferred embodiment of the microporous screen in accordance with the invention is illustrated by way of example in the enclosed drawing.

Fig. 1 shows a cross sectional view of a screen.

Fig. 2 is a corresponding view in elevation.

Fig. 3 is an enlarged cross sectional view.

Fig. 4 is a photomicrograph of a screen in accordance with the invention. The cross-hatched or black portions illustrate the agglomerated components of the binder. The white portions illustrate elements of the absorbing material.

The embodiment illustrates a screen having a wavy form but it will be understood that the invention is not limited to such embodiment and that it covers all possible embodiments of screens manufactured as described above.

We claim:

1. A process of making a microporous screen which comprises intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet but insufficient to destroy the porosity of the dry absorbent material, and heating the resulting sheet at a temperature of 120 to 180° C.

2. A process as defined in claim 1, wherein the resin is a vinyl resin.

3. A process as defined in claim 1, wherein the resin is polystyrene.

4. A process as defined in claim 1, wherein the resin is vinyl chloride.

5. A process of making a microporous screen which comprises intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet but insufficient to destroy the porosity of the dry absorbent material, the pressure varying in different areas of said sheet, and heating the resulting sheet at a temperature of 120 to 180° C.

6. A process of making a microporous screen which comprises intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet but insufficient to destroy the porosity of the dry absorbent material and said pressure being exerted by means of two spaced-apart surfaces, the points on one surface being at varying distances from the points on the other surface, whereby the pressure varies in different areas of said sheet, and heating the resulting sheet at a temperature of 120 to 180° C.

7. A microporous sheet which comprises a synthetic thermoplastic resin containing in intimate admixture a dry absorbent microporous acid- and solvent-resistant material, said sheet having areas of different microporosity, said thermoplastic synthetic resin in said sheet comprising particles welded together at their points of contact with the dry absorbent material disposed in the interstices, whereby said sheet is provided with intercommunicating pores forming sinuous canals providing multiple passageways for the flow of liquids from one face of said sheet to the other.

8. A microporous sheet which comprises a synthetic thermoplastic resin containing in intimate admixture a dry absorbent microporous acid- and solvent-resistant material, a plasticizer and a loading agent, said sheet having areas of different microporosity, said thermoplastic synthetic resin in said sheet comprising particles welded together at their points of contact with the dry absorbent material disposed in the interstices, whereby said sheet is provided with intercommunicating pores forming sinuous canals providing multiple passageways for the flow of liquids from one face of said sheet to the other.

9. A process of making a microporous screen for use as a separator in an electric storage battery which comprises, intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet by effecting adhesion of the synthetic resin particles among themselves, but insufficient to destroy the porosity of the dry absorbent material, said pressure effecting a reduction in the thickness of the sheet of about two-thirds, and heating the resulting sheet at a temperature of 120 to 180° C. to soften the resin particles.

10. A process of making a microporous screen for use as a separator in an electric storage battery which comprises, intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet by effecting adhesion of the synthetic resin particles among themselves, but insufficient to destroy the porosity of the dry absorbent material, said pressure effecting a reduction in the thickness of the sheet of about two-thirds, said pressure varying in different areas of said sheet, and heating the resulting sheet at a temperature of 120 to 180° C. to soften the resin particles.

11. A process of making a microporous screen for use as a separator in an electric storage battery which comprises, intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet by effecting adhesion of the synthetic resin particles among themselves, but insufficient to destroy the porosity of the dry absorbent material, said pressure effecting a reduction in the thickness of the sheet of about two-thirds, said pressure being exerted by means of two spaced apart surfaces, the points on one surface being at varying distances from the points on the other surface, whereby the pressure varies in different areas of said sheet, and heating the resulting sheet at a temperature of 120 to 180° C. to soften the resin particles.

12. A process of making a microporous screen for use as a separator in an electric storage battery which comprises, intimately mixing a finely-divided synthetic thermoplastic resin and a dry microporous absorbent acid- and solvent-resistant material, subjecting the resulting mixture to moderate pressure to form a sheet therefrom, said pressure being sufficient to form the desired sheet by effecting adhesion of the synthetic resin particles among themselves, but insufficient to destroy the porosity of the dry absorbent material, about two parts by weight of said resin being present for each part of said microporous absorbent material and said pressure effecting a reduction in the thickness of the sheet of about two-thirds by volume, and heating the resulting sheet at a temperature of 120 to 180° C. to soften the resin particles, whereby the particles of the thermoplastic synthetic resin are welded together at their points of contact with the dry absorbent material disposed in the interstices and said sheet is provided with intercommunicating pores forming sinuous canals providing multiple passageways for the flow of liquids from one face of said sheet to the other.

13. A process as defined in claim 12, wherein the thermoplastic synthetic resin is vinyl chloride.

References Cited in the file of this patent

UNITED STATES PATENTS

| 1,918,893 | Beckmann | July 18, 1933 |
| 2,353,877 | Chollar | July 18, 1944 |
| 2,504,208 | Locke et al. | Apr. 18, 1950 |
| 2,525,965 | Smith | Oct. 17, 1950 |
| 2,526,311 | Wilson | Oct. 17, 1950 |